UNITED STATES PATENT OFFICE.

GEORGE BROWN HOLDEN, OF LOWELL, MASSACHUSETTS.

LUBRICANT FOR WOOL AND PROCESS OF MAKING SAME.

SPECIFICATION forming part of Letters Patent No. 720,922, dated February 17, 1903.

Application filed November 20, 1902. Serial No. 132,163. (No specimens.)

*To all whom it may concern:*

Be it known that I, GEORGE BROWN HOLDEN, a citizen of the United States, and a resident of Lowell, in the county of Middlesex and State of Massachusetts, have invented a new and Improved Lubricant for Wool and Process for Making the Same, of which the following is a full, clear, and exact description.

My invention relates to a lubricant for wool and to a process for making such lubricant.

The idea underlying my invention is to cause wool to run smoothly through the machinery used in operating the same during the process of manufacture and also to soften the wool and render it pliable.

I dissolve fifteen pounds of turpentine-pitch in ten gallons of water, and also dissolve seven pounds of quillai in ten gallons of water, and then add the two solutions together. I next boil the resulting liquid for fifteen minutes and add eighty pounds of soda-ash, ten gallons of water, and five pounds of carbonate of ammonia. I next boil the mixture twenty minutes. I then dissolve five pounds of borax in twenty pounds of water and add the same to the mixture. I then boil the entire mixture for one hour, after which I add five gallons of water, then stir well and add twenty-five pounds of oleic acid. Independently of the steps just mentioned I stir five gallons of lard-oil and five gallons of cotton-seed oil together and boil the same for five minutes, then add forty pounds of caustic soda of a strength of thirty-nine and one-half degrees and add the mixture thus produced to the liquid prepared as above stated, being careful to admix the two liquids quite slowly and to maintain the temperature thereof at the boiling-point. During the time of mixing I also add water. I next draw the mixture into a separate receptacle and boil it until it is clear and free from foam. I next add ten gallons of palm-oil and ten gallons of water and boil the liquid until the oil is thoroughly incorporated, after which I add twenty gallons of olive-oil, ten gallons of cotton-seed oil, and thirty-seven gallons of lard-oil. The entire liquid is now thoroughly stirred and water enough is added to bring the general temperature of the liquid down to 175° Fahrenheit, when the process of manufacture is ended.

Having thus described my invention, I claim as new and desire to secure by Letters Patent—

1. The process, herein described, of making a lubricant for wool, which consists in dissolving turpentine-pitch and quillai in water, boiling the same, adding soda-ash and carbonate of ammonia thereto, again boiling the mixture, adding a solution of borax to the same and again boiling, adding oleic acid, heated lard and heated cotton-seed oil thereto, then caustic soda and again boiling the mixture, and finally adding palm-oil, water, olive-oil, cotton-seed oil and lard-oil.

2. The herein-described lubricant for wool, made by adding turpentine-pitch, quillai, soda-ash, carbonate of ammonia, oleic acid, lard-oil, cotton-seed oil, caustic soda, palm-oil, olive-oil and water.

3. The herein-described lubricant for wool, made by adding turpentine-pitch fifteen pounds, quillai seven pounds, soda-ash eighty pounds, carbonate of ammonia five pounds, borax five pounds, oleic acid twenty-five pounds, lard-oil forty-two gallons, cotton-seed oil fifteen gallons, caustic soda forty pounds, palm-oil ten gallons, olive-oil twenty gallons, and a suitable quantity of water.

In testimony whereof I have signed my name to this specification in the presence of two subscribing witnesses.

GEORGE BROWN HOLDEN.

Witnesses:
   JOHN J. PICKMAN,
   ROSE E. PROVENCHER.